United States Patent [19]

Deacon

[11] Patent Number: 4,991,802

[45] Date of Patent: Feb. 12, 1991

[54] SUSPENSION DEVICE FOR CABLE OR A LIKE LINEAR BODY

[76] Inventor: Lawrence A. Deacon, 3855 Remsen Rd., Medina, Ohio 44256

[21] Appl. No.: 482,703

[22] Filed: Feb. 21, 1990

[51] Int. Cl.⁵ .............................................. B60D 1/00
[52] U.S. Cl. ...................................... 248/60; 248/328
[58] Field of Search ....................... 248/60, 51, 61, 58, 248/63, 328

[56] References Cited

U.S. PATENT DOCUMENTS

| | | | |
|---|---|---|---|
| 1,951,890 | 3/1934 | Waldau | 248/30.5 |
| 2,095,185 | 10/1937 | Fish | 248/51 |
| 2,398,013 | 4/1946 | Kyle | 248/63 |
| 2,549,717 | 1/1947 | Snodgrass | 248/51 |
| 2,761,273 | 9/1956 | Peterson | 248/63 X |
| 2,943,135 | 6/1960 | Bertling | 248/63 X |
| 3,299,626 | 1/1967 | Payer | 248/63 X |
| 3,312,434 | 4/1967 | Simon | 248/62 |
| 3,633,252 | 1/1972 | Williams et al. | 24/123 C |
| 3,650,545 | 3/1972 | Freed | 280/421 |
| 4,752,054 | 6/1988 | Jonsson | 248/51 |
| 4,846,320 | 7/1989 | Clarke | 191/12 R |

Primary Examiner—Ramon O. Ramirez
Assistant Examiner—Robert A. Olson
Attorney, Agent, or Firm—Baldwin, Egan, Fetzer, Oldham & Oldham

[57] ABSTRACT

A suspension device for cable or the like, formed of nonmetallic flexible material woven or braided into elongated, tubular or sleeve-like form so that the cable or a like flexible linear body, can be passed through the central passageway of the suspension device and out an opening formed in the defining sidewall of the device and be frictionally gripped or held by the device against lengthwise movement relative to the suspension device, and wherein the latter can be formed at one end thereof into a self-retaining loop for securing the device and gripped cable or other linear body to an overhead support, thus transmitting any tensile load applied to the cable or other linear body to the support via the suspension device and thus preventing any tensile load being transmitted along the cable or other linear body to its connection point, such as, for instance, an electrical junction box.

23 Claims, 4 Drawing Sheets

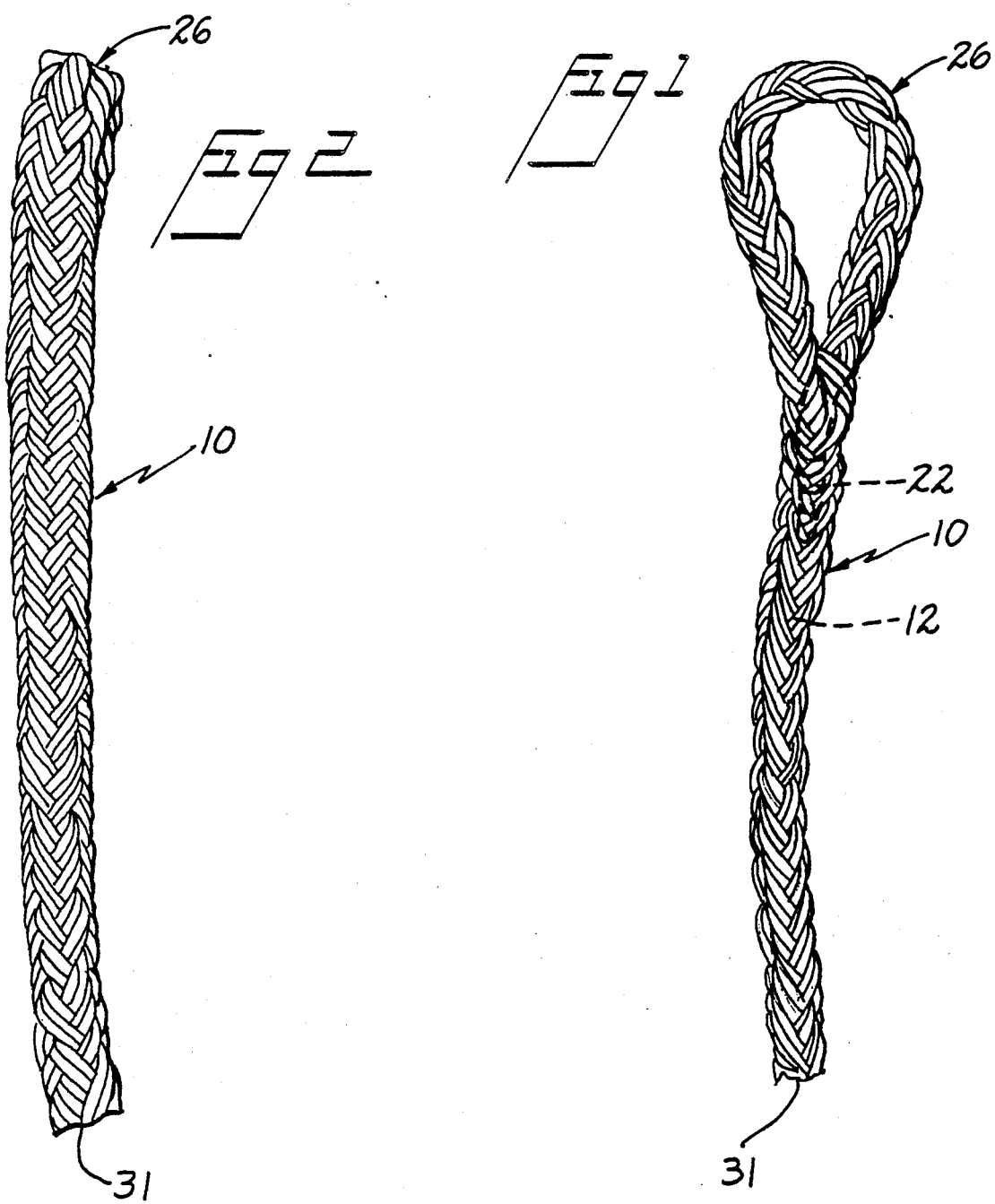

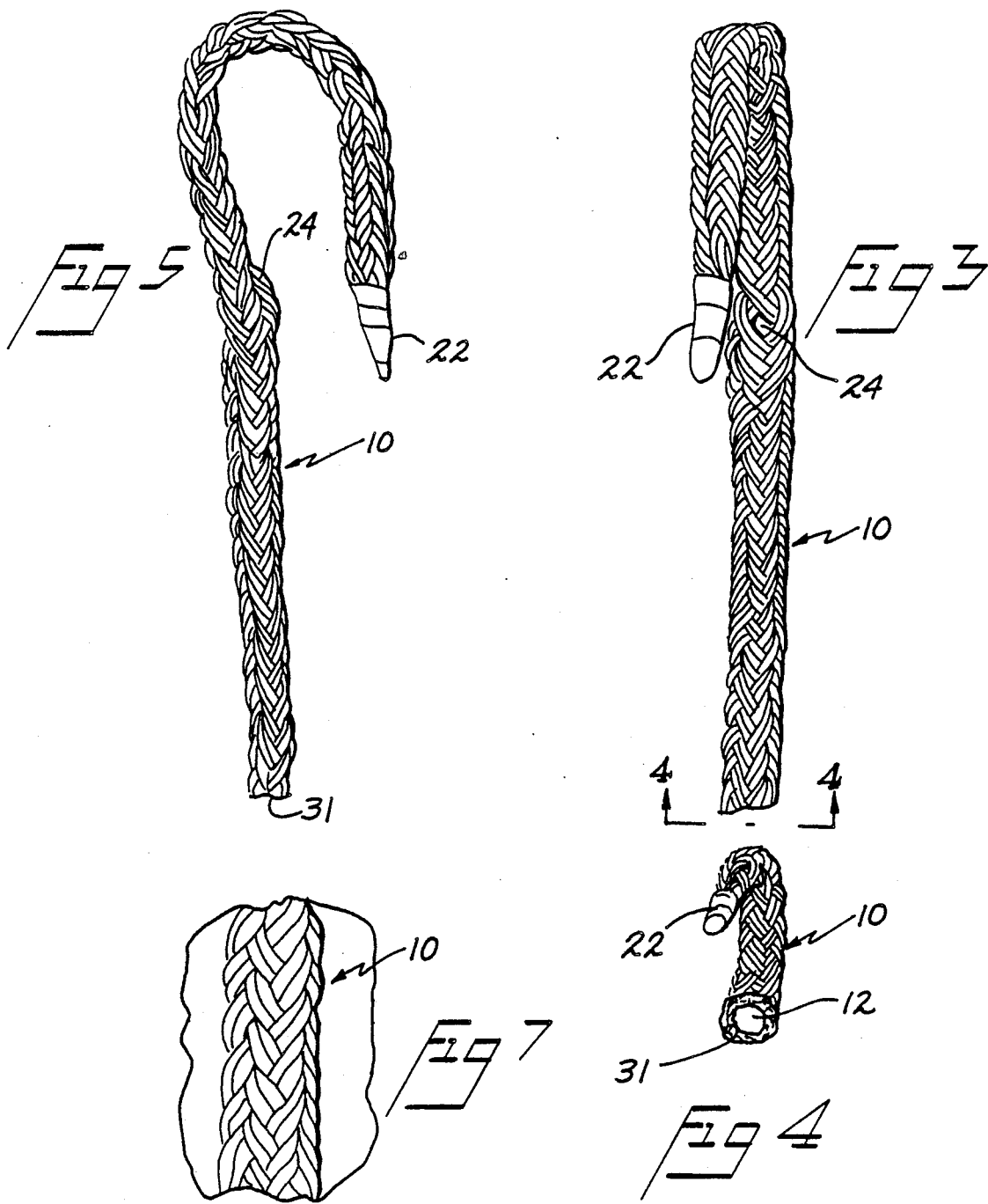

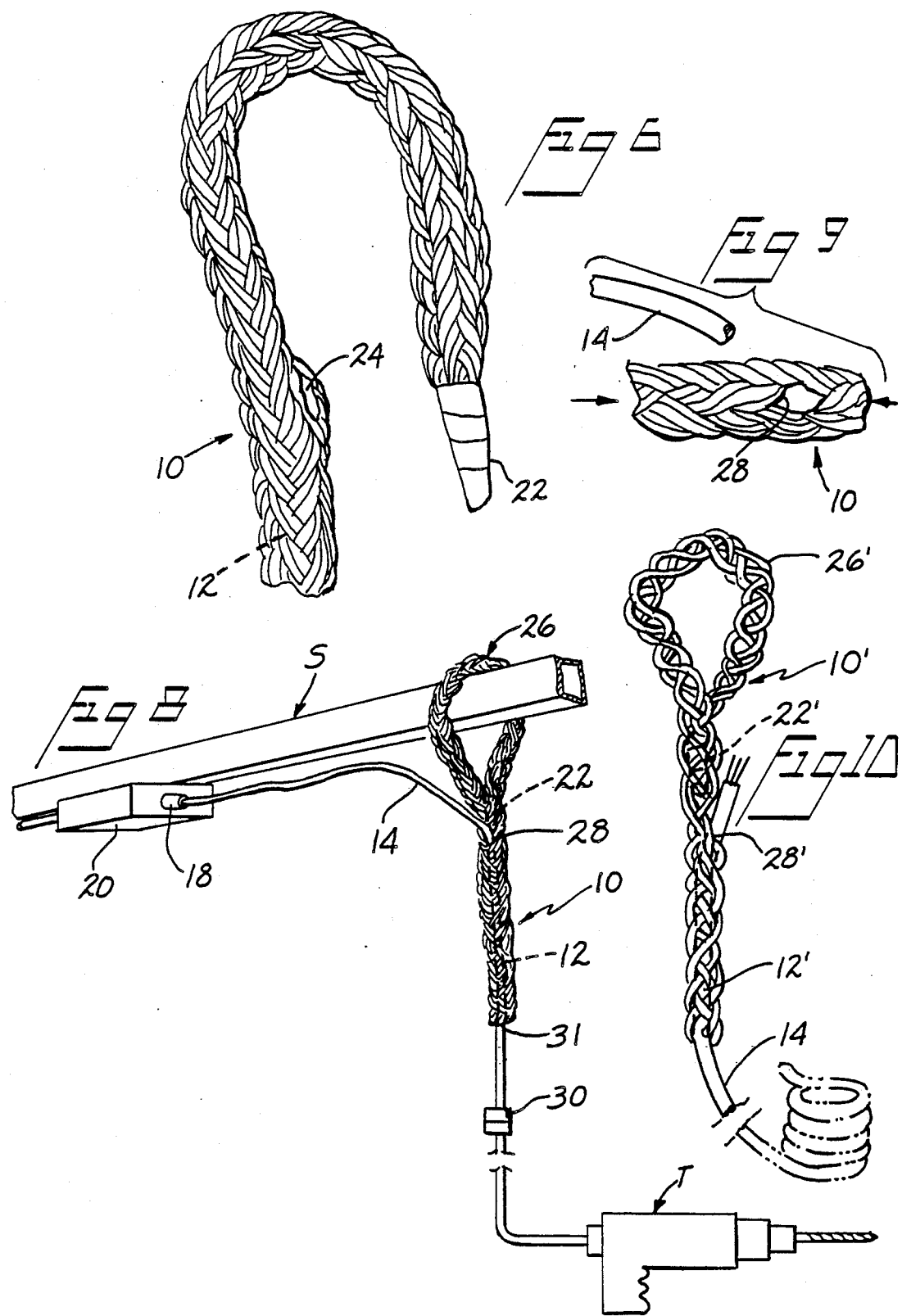

SUSPENSION DEVICE FOR CABLE OR A LIKE LINEAR BODY

This invention relates in general to the engagement and suspension of flexible linear bodies such as, for instance, individual cables or wires, air hose, or the like and is particularly concerned with the attachment of such linear bodies to an overhead support in such way that the linear body is frictionally gripped by the hanger or suspension device in avoidance of axial displacement relative to the hanger or suspension device, thus preventing tensile loads from being transmitted along the cable or linear body to its connection point, such as, for instance, in the case of an electrical cable, an electrical junction box.

BACKGROUND OF THE INVENTION

Hanger devices for cables or other types of linear bodies are known in the art. Metallic hangers are known which are formed from woven or braided wire and oriented into sleeve or tubular-like form with an integrally formed hanger or end support at one end thereof, and adapted to receive electrical cable through the central passageway in the wire hanger, and wherein said end support on the hanger is adapted to be secured to an overhead support and suspend the cable from the overhead support while gripping the associated cable, to prevent tensile loads applied to the cable from being passed along the cable to its connection point, such as, for instance, an electrical junction box. However, such known metallic wire hanger devices are expensive and attachment of the wire hanger device to an overhead support is cumbersome and somewhat time consuming.

It is also known in the prior art to form suspension devices for gripping cords and cable-like members from nonmetallic or plastic material. U.S. Pat. No. 1,951,890 dated Mar. 20, 1934 and issued to E. A. Waldau and entitled Connection Cable For Electrical Flatirons, Cooking Apparatus, And The Like and U.S. Pat. No. 2,549,717 dated Apr. 17, 1951 and issued to J. A. Snodgrass and entitled Ironing Cord Holder, disclose flexible suspensions for electrical cords.

U.S. Pat. No. 3,650,545 dated Mar. 21, 1972 and issued to William E. Freed and entitled Hose Support And Guide, and U.S. Pat. No. 4,846,320 dated July 11, 1989 and issued to Dale M. Clarke and entitled Cable Hanger For Electrically Powered Mine Vehicles, disclose overhead suspension supports for cable-like members.

U.S. Pat. No. 3,633,252 dated Jan. 11, 1972 and issued to Harrison L. Williams et al and entitled Appliance For Linear Bodies, discloses dead end cable supports embodying helically formed leg portions for encompassing and frictionally gripping associated electrical cord. This patent teaches that the support is preferably formed of plastic but could be fabricated from wire.

U.S. Pat. No. 4,752,054 dated June 21, 1988 and issued to Borie Jonsson and entitled Suspension Means For Extension Cords Etc. teaches a flexible plastic suspension article for cords, and U.S. Pat. No. 4,846,320 dated July 11, 1989 to Dale M. Clarke and entitled Cable Hanger For Electrically Powered Mine Vehicles discloses a power cable hanger for a mine.

However, none of the above prior art teaches the relatively low cost nonmetallic, braided or woven article of the present invention which can be expeditiously formed into a hanger at the site of use, and which is comprised of nonmetallic flexible material woven or braided into elongated tubular or sleeve-like form, and which can be adapted at the site of use for receiving in frictional gripping relation and suspending a cable or like linear body therein, and which can be readily formed at one end at the site, into a loop portion, for securing the hanger device and frictionally gripped cable or like linear body to an overhead support.

SUMMARY OF THE INVENTION

Accordingly, an object of the invention is to provide a novel hanger device for suspending a cable or other generally flexible linear member from an overhead support, and wherein the hanger device is formed of nonmetallic flexible material receiving the linear member or cable through a central passageway in the device, where the cable or linear member is adapted to be frictionally gripped by the hanger to support or suspend it from the overhead support, and wherein the hanger device can be fabricated or formed at the site of use with an integral loop-portion adapted for suspending the hanger and associated cable or linear member to the overhead support.

Another object of the invention is to provide a hanger device of the above type which can be conveniently formed from known woven plastic rope, and which can be substituted for conventional fabricated metal wire hangers used to support electrical cable and the like from an overhead support, and wherein the hanger member of the present invention is more universally adaptable to different sizes and kinds of overhead supports in its operation or function of supporting or dead ending a flexible cable or other flexible linear member from an overhead support.

A still further object of the invention is to provide a nonmetallic hanger member of the aforementioned type which is relatively low cost and substantially lower in cost than the cost of fabricated wire hangers conventionally utilized for this function.

A still further object of the invention is to provide a novel nonmetallic hanger of the above discussed type which is formed of polypropylene filaments or fibers, woven or braided into a rope-like member having a centrally located axial passageway extending therethrough for receiving and frictionally gripping an associated cable or other type flexible linear member, and wherein the hanger member can be readily adapted to any size or style of overhead support at the site of use.

Other objects and advantages of the invention will be apparent from the following description taken in conjunction with the accompanying drawings wherein:

BRIEF DESCRIPTION OF THE DRAWINGS

FIG. 1 is a front elevational view of a nonmetallic hanger formed in accordance with the invention;

FIG. 2 is an elevational view of the FIG. 1 hanger, taken from the left hand side thereof;

FIG. 3 is a fragmentary, view of the nonmetallic hanger of FIGS. 1 and 2 illustrating one end of the hanger member preparatory to inserting such end into a receiving opening formed in the defining wall of the hanger member in the process of forming a loop at one end of the hanger member for securing the hanger member to an overhead support, and thus grip and support an associated linear member, such as, for instance, an electrical cable, on the overhead support by means of the hanger member;

FIG. 4 ia a reduced size view taken generally along the plane of line 4—4 of FIG. 3 looking in the direction of the arrows and illustrating the lengthwise extending passageway in the hanger member;

FIG. 5 is an elevational view of the FIG. 3 hanger member taken from the left hand side of FIG. 3;

FIG. 6 is an enlarged, fragmentary view taken from the FIG. 5 illustration, showing in greater detail the formed opening in the sidewall of the nonmetallic hanger member preparatory to receiving therein in self-retained relation the distal end of the hanger body, to thus form a self-retaining loop which in use is adapted to encircle an overhead support and suspend the hanger and associated gripped linear member such as an electrical cable, from the overhead support;

FIG. 7 is an enlarged, fragmentary view taken from FIG. 5, showing in somewhat enlarged detail the woven or braided construction of the hanger member;

FIG. 8 is a partially broken, diagrammatic fragmentary illustration of one of the hanger members coating in frictionally gripping supporting relation with an electrical cord or cable, to suspend or dead end the cord from an overhead support beam, with the cord being plugged at one end into an overhead junction box supported by the beam, and at the other end thereof being attached to a tool (shown for illustrative purposes only in the form of a portable electrical tool). The frictionally gripping coaction of the hanger member with the associated cord extending through the lengthwise passageway of the hanger, prevents the transmittal of tensile forces along the cord to the connection of the cord to the junction, box, and instead applies any such tensile force to the overhead support beam;

FIG. 9 is a fragmentary illustration showing the movement of the linear member (illustrated as an electrical cable or cord) out of the sidewall of the hanger member from the interior passageway therethrough in the act of inserting the electrical cord through the passageway in the hanger member body and out the sidewall thereof for suspending the cord or cable from an overhead support;

FIG. 10 illustrates another embodiment of nonmetallic hanger member in accordance with the invention, and formed from a nonmetallic sleeve having a more open weave or braid as compared to the previously illustrated and described hanger member of FIGS. 1-9, and showing diagrammatically the feeding of an electrical cord through the lower end of the hanger member and into the lengthwise passage therethrough, and then out the sidewall thereof, thus placing the electrical cord in coacting assembled relationship with the hanger member, the latter being shown with a formed loop at one end thereof for hanging the hanger member onto an overhead support;

FIG. 11 is a generally diagrammatic, sectional view taken along the plane of line 11—11 of FIG. 13 looking in the direction of the arrows, and showing the preferred manner of passing an electrical cord or other flexible linear member through the hanger member, by application of pressure from opposite ends of the hanger member to enlarge the lengthwise passageway and thus facilitate movement of the cord or cable through the passageway and out the opening in the defining sidewall of the hanger member, for attachment to a junction box or the like;

DESCRIPTION OF PREFERRED EMBODIMENT AND ALTERNATE EMBODIMENT

Figure 11:
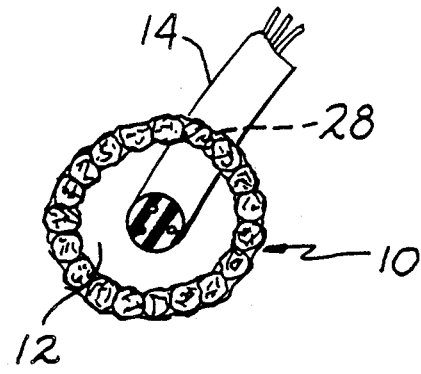

Referring now again in particular to FIGS. 1-9, there is disclosed a hanger member 10 formed in accordance with the invention, and comprising an elongated braided or woven article formed of nonmetallic material, such as, for instance, flexible plastic strands (for instance, polypropylene, nylon or Dacron®) and defining an elongated passageway 12 (FIG. 4) through the braided or woven hanger member, adapted to receive therein an elongated flexible linear member 14, such as, for instance, an electric cable, or pressurized air hose, or the like, so as to suspend the cable or flexible linear member from an overhead support S (FIG. 8) with the hanger member 10 being adapted to frictionally grip the received cable 14 and to suspend or hold it on the support S via the hanger 10 and prevent tensile force from being transmitted via the cable member to its connection (e.g. 18) of some other device or apparatus, such as, for instance, the electrical junction box 20 illustrated in FIG. 8.

The flexible hanger member 10 as can be best seen in FIG. 6, is preferably formed at one distal end thereof, with a tapered end 22 which can be provided as, for instance, by taping such end of the length of braided or woven article, with such tapered end 22 being adapted to be received through an opening 24 in the sidewall of the hanger 10.

Opening 24 communicates with passageway 12 through the defining wall of the hanger 10, and as can be best seen in FIG. 1, when the tapered end 22 is inserted through the opening 24 into the passageway 12, the hanger is thus provided with a formed self sustaining loop section 26 (FIG. 1) which is adapted to encompass the overhead support S, and thus hold the hanger and associated cable 14 or other linear member in suspended relation on the support S. It will be understood that such arrangement provides for accommodating any size or width of support S, since the opening 24 can be formed in the wall of the hanger body at the site of use, in whatever location is desired, or required, for providing for the encirclement of the loop section of the hanger about the support S to attach the hanger to the support.

Opening 24 can be readily formed in the woven or braided wall of the hanger by forcing the strand material thereof apart to permit communication with the axial passageway 12, with the tapered end 22 of the hanger facilitating the movement of the distal end of the hanger through the opening 24 and into the passageway 12, whereupon the frictional gripping coaction of the flexible hanger wall with respect to the received end 22, holds the loop portion 26 in its formed condition.

Hanger member 10 can be cut or formed from an off-the-shelf woven or braided rope product such as woven polypropylene rope or woven nylon or Dacron ® rope, which products conventionally may be woven with the filaments thereof defining a central passageway through the selected length of rope section and with such rope being conducive to grip an elongated article inserted through the axial passageway in the rope section upon applying tensile force to the elongated article, such as electrical cable, disposed in the passageway.

As can be best seen in FIG. 8, the elongated article or cable 14 is preferably inserted from the bottom of the hanger member through the entranceway to passageway 12, and is fed upwardly or through the hanger passageway 12 preferably to a point closely adjacent the received tip 22 in passageway 12 of the hanger, whereupon the cable is then forced or fed out through a formed opening 28 in the sidewall of the hanger article, and of sufficient length so that it (the cable 14) can be attached to whatever device the cable is adapted to be connected to, such as, for instance, the aforementioned juncture box 20.

Thus when the elongated member 14 is utilized for supplying electrical current to a machine such as a portable hand tool T diagrammatically illustrated in FIG. 8, any tensile force applied via the cable 14 passing upwardly through the hanger 10 is transmitted to the overhead support S and is not transmitted to the juncture 18 of the cable 14 to the box 20, thus preventing inadvertent "pull-out" of the cable from the juncture box.

While a portable tool T has been illustrated in FIG. 8, it will be understood that such is for exemplary purposes only and that such "tool" could be a fixed machine tool in a factory or the like, with the overhead cable 14 coming down from the overhead support S to furnish power to such a fixed machine tool, and in a manner which facilitates the suspension of the current supplying cable 14 to the tool as diagrammatically illustrated in FIG. 8. The cable 14, or other flexible linear member, may also include a rotary, quick disconnect 30 of conventional type, which enables the ready connection and disconnection of the tool to the overhead or upper stretch of cable 14, thus facilitating the convenient connection and disconnection of the tool from the overhead cable and its attachment to the overhead support S.

As previously specified, the preferred method of assembling the cable or flexible linear member with the hanger 10 is to feed the member 14 up from the bottom through the entranceway 31 (FIGS. 1 and 2) to passageway 12, through the passageway to the location from which the cable is adapted to be extended through the sidewall, and then forming opening 28 in the sidewall. However, opening 28 could be formed first and then the cable or the like could be fed from exteriorly of the hanger through opening 28 and thence down through passageway 12 to the tool, thus reversing the procedure first described.

Opening 28 can be readily formed by inserting a sharpened instrument, such as a screwdriver or the like, between the strands of the weave, and feeding the end of the cable through such formed opening and out thereof for a sufficient length so that the cable or linear member 14 can be attached or otherwise secured to its connector point, such as the aforementioned juncture box 20. As aforedescribed, it is preferable that the cable 14 exit through the sidewall of the hanger adjacent to or just below the end 22 of the hanger which is disposed in the passageway 12 to form the suspending loop 26.

Figure 13:
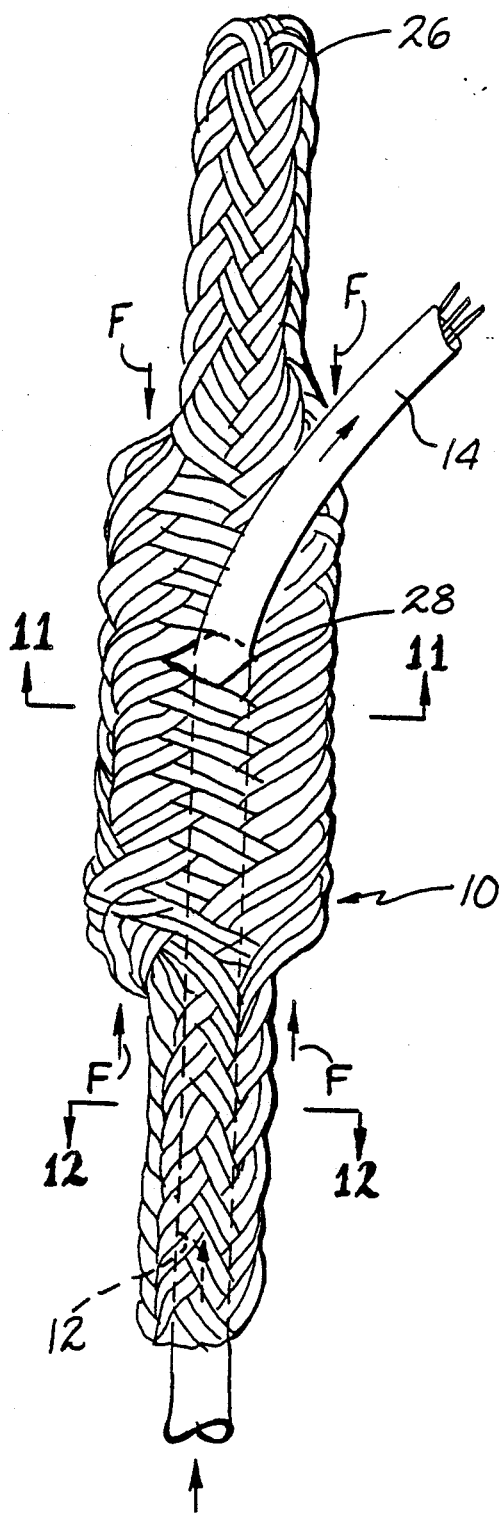
FIG. 13 is an enlarged fragmentary view of a hanger showing the insertion of a flexible linear member (e.g. cable) up through the bottom or underside of the hanger member defining the lower end of the axial passageway through the hanger member and out a formed opening in the sidewall thereof, for connecting the cable to a further part, such as, for instance, a junction box, with the upper end of the hanger member being illustrated as formed in a loop about an overhead support (shown in phantom lines) and with the body of the hanger member upon release of the end pressure shown by the full line arrows, being adapted to frictionally grip the linear member or cable, and hold it in suspended relation to the overhead support, via the hanger member.
Figure 12:
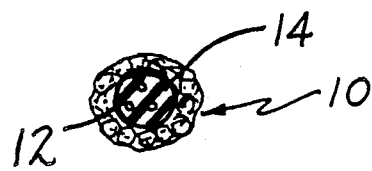
FIG. 12 is a sectional view taken generally along the plane of line 12—12 of FIG. 13 looking in the direction of the arrows.

As can be best seen in FIG. 13, the passageway 12 through the hanger 10 in its non-stressed condition is preferably slightly smaller than the diameter of the flexible member 14 adapted to be received therethrough, for facilitating the gripping of the cable 14 by the hanger in the suspensory function of the latter. By applying force represented by the arrows F to opposite end portions of the hanger member, the passageway 12 through the hanger member can be enlarged somewhat due to the fact that the strands are moved from the acute angular relationship shown, for instance, in FIGS. 1, 2 and 7 to an angular relationship illustrated, for instance, in the deformed central portion of FIG. 13, thus making the passageway 12 larger and reducing or eliminating frictional drag on the cable or linear member 14 as it is forced or moved through passageway 12 and out opening 28 in the sidewall, preparatory to attaching the cable to its connection point 18.

Referring now to FIG. 10, there is shown another embodiment of hanger member 10' wherein the weave or braid of the member is more open as compared to that of the embodiment illustrated in FIGS. 1–9 and FIGS. 11–13. Such "open weave" embodiment is adapted to operate and to be associated with the cable (or other flexible linear member) in the same manner aforedescribed in connection with the FIGS. 1–9 embodiment, but due to the "open" nature of the weave or braid, the passage of the cable through the sidewall of the hanger is facilitated since openings already exist in the sidewall through which the cable can be readily fed to exit out, preparatory to attaching it to its connection point 18 on, for instance, junction box 20. The "open" weave or braid also facilitates the movement of the cable through the passageway 12' in the hanger member due to generally less frictional drag between the defining wall of the hanger member and the cable, as well as facilitating the formation of the loop portion 26' on the hanger since openings already exist in the sidewall for receiving the distal end of the hanger section therethrough, and into held coaction with the hanger body section, when it is desired to form the loop portion for suspending the hanger member from an overhead support. In other respects, the FIG. 10 embodiment may be generally similar to that of the first described embodiment.

While a taped end 22 has been illustrated in the drawings for facilitating insertion of the one end of the hanger through opening 24 into passageway 12 in the process of forming the self sustaining support connecting loop portion 26, another method that may be utilized rather than tape binding, is by heat fusing the strands of material together at said one end by applying sufficient heat to such end of a plastic material hanger, so that the strands at the end are bonded together for facilitating movement of the said hanger end through opening 24 and into passageway 12.

From the foregoing discussion and accompanying drawings, it will be seen that the invention provides a novel suspensory device for a cable or like flexible linear member, comprising an elongated woven or braided member formed of flexible nonmetallic strands and defining an elongated lengthwise passageway through the suspensory member, with one end of the suspensory member being adapted to be doubled back upon itself and to be insertable from exteriorly thereof through an opening formed through the suspensory member and into the lengthwise passageway, to form a selected size support loop at one end of the suspensory member for attaching the latter to an overhead support, and with a generally flexible cable or like linear member being adapted to be fed through the passageway and out another opening formed through the sidewall of the suspensory member for extension of the cable an adequate amount to attach it to its connector point, such as, for instance, an electrical juncture box, and with the suspensory member being operable to suspend the cable or other linear member on the overhead support and frictionally grip the same so that any tensile force applied to the cable member or other linear member is not transmitted along the cable or like member but instead is transmitted via the suspensory member to the overhead support, thus preventing inadvertent separation of the cable or like member from its connector point.

The invention also provides a novel method of suspending a cable or other flexible linear member on an overhead support, and wherein the suspensory device may be formed from woven or braided nonmetallic rope-like material.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A device for suspending an elongated generally flexible cable and the like, from an overhead support said device comprising:
   an elongated braided or woven member formed of flexible nonmetallic strands and defining a wall encompassing an elongated generally lengthwise extending passageway in said member, the diameter of said passageway being enlarged by imposing a lengthwise compressive force upon said member and decreased by imposing a lengthwise tensile force;
   a first end of said member being doubled back upon itself for insertion from exteriorly of said member through a first opening formed through the strands of said wall of said member and into said passageway, to provide a formed securement loop at said first end for attaching said member to said overhead support; and
   said member having a second opening through the strands of said wall thereof below the first mentioned opening and from said passageway for receiving therethrough said cable or the like, the suspended weight of said cable upon said member providing sufficient lengthwise tensile force upon said member to put said member into gripped relation with said cable or the like.

2. A device in accordance with claim 1 wherein said member is formed of plastic strands and the strands at said one end are secured to one another by heat fusion of the strands at said one end for facilitating insertion of said one end into the first mentioned opening and thence into said passageway for formation of said formed loop.

3. A device in accordance with claim 1 wherein said strands at said one end are secured to one another by tape binding said one end of said member for facilitating insertion of said one end into the first mentioned opening and thence into said passageway for formation of said formed loop.

4. A device in accordance with claim 1 wherein said one end of said member is of generally pointed configuration with said strands at said one end being generally secured to one another for facilitating entry of said one end into the first mentioned opening and thence into said passageway upon said doubling back of said member upon itself.

5. A device in accordance with claim 1 wherein said strands are braided or woven in a relatively tight weave, so that no readily apparent openings appear in said wall of said member in the absence of lengthwise compressive force upon said member.

6. A device in accordance with claim 1 wherein said strands are braided or woven into a relatively loose weave whereby formed openings exist between adjacent strands and provide the first mentioned opening for receiving said one end therethrough in the formation of said securement loop.

7. A device in accordance with claim 1 wherein said device is provided by initially severing from a length of said braided or woven strand material a selected sectional length, to form said member of a selected length.

8. A device in accordance with claim 1 wherein said member is formed of flexible plastic strands.

9. A device in accordance with claim 8 wherein said flexible plastic strands are polypropylene.

10. A method of suspending a cable or the like on an overhead support, said method comprising:
    providing a length of braided or woven member formed of nonmetallic flexible strands defining said member with a flexible wall encompassing an elongated lengthwise directed passageway through said member, the diameter of said passageway being enlarged by imposing a lengthwise compressive force upon said member and decreased by imposing a lengthwise tensile force;
    providing a first opening through the strands of said member and into communication with said passageway and doubling said member adjacent a first end thereof back upon itself and around said overhead support, and inserting said first end through said first opening and into said passageway, to form a closed loop which is operative for attaching said member to the overhead support,
    providing a second opening below the first opening through said wall of said member and inserting said cable or like flexible linear article into said passageway and through said second opening and extending said cable or the like from said passageway in a direction away from said loop, whereby the suspended weight of said cable or the like upon said member provides a sufficient lengthwise tensile force to put said member into gripped relation with said cable, minimizing lengthwise movement of said cable relative to said member.

11. A method in accordance with claim 10 wherein the first mentioned opening is provided in said wall by forcing the strands at a selected location in said wall laterally apart sufficiently to receive said one end of said member therethrough and into said passageway, in order to provide said closed loop.

12. A method in accordance with claim 10 which includes providing the braided or woven member of flexible plastic strands, defining said wall.

13. A method in accordance with claim 10 which includes providing the braided or woven member as a length of braided or wove polypropolylene rope.

14. A method in accordance with claim 10 wherein said first mentioned opening and said other opening are provided by forming said member with a relatively loose weave whereby formed openings exist in said wall between adjacent of said strands.

15. A method in accordance with claim 10 wherein said first mentioned opening and said other opening are provided by forming said member with a relatively tight weave so that no readily apparent openings appear in said wall, and then forcing adjacent of said strands apart at selected locations along said member to form said first mentioned and said other openings.

16. In a method of providing a gripping suspension of a cable or the like from an overhead support comprising:
   providing a length of flexible braided or woven member formed of flexible strands defining said member with a flexible wall encompassing an elongated lengthwise directed passageway through said member, doubling said member back upon itself adjacent one end thereof and around the overhead support at the site of use;
   providing an opening through the strands of said member and into communication with said passageway; and
   inserting said end through said opening and into said passageway, to form a closed selected size loop operative to attach said member to said overhead support.

17. A method in accordance with claim 16 wherein the flexible braided or woven member consists of a predetermined length of flexible polypropylene rope and including the step of heat bonding said one end of said member to cause securement of the strands at said one together, said heat bonding securement facilitating the entry of said one end of said member through said opening into said passageway, in the process of forming said loop.

18. A method in accordance with claim 16 including the step of taping said one end of said member with tape to form a generally pointed configuration to said one end which generally pointed configuration facilitates entry of said one end of said member through said opening and into said passageway in the process of forming said loop.

19. A method in accordance with claim 16 including the step of forming said opening in said wall by forcing selected of said strands laterally away from one another to define said opening in the process of forming said loop.

20. A method in accordance with claim 16 including providing said braided or woven member in the form of braided or woven flexible plastic strands defining said wall, and providing a generally pointed configuration to said one end for facilitating the entry of said one end through said opening and into said passageway in the process of providing said closed loop.

21. A method in accordance with claim 16 including the step of inserting a flexible linear member such as said cable or the like into said passageway for suspending said cable or the like in gripped relation by said member.

22. A method in accordance with claim 21 wherein said cable or the like is inserted into said passageway from the lower end of said member and then out an opening in said wall disposed below the first mentioned opening for attachment of an end of said cable or the like to a power fixture such as a junction box.

23. A method in accordance with claim 21 wherein said cable or the like is inserted through an opening in said wall from exteriorly thereof and thence into and through said passageway out the bottom end thereof, with the last mentioned opening being disposed below the first mentioned opening.

* * * * *